(12) United States Patent
Rothbauer et al.

(10) Patent No.: US 8,459,229 B2
(45) Date of Patent: Jun. 11, 2013

(54) PISTON BOWL WITH SPRAY JET TARGETS

(75) Inventors: Rainer J. Rothbauer, San Antonio, TX (US); Charles E. Roberts, Jr., Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 399 days.

(21) Appl. No.: 12/763,468

(22) Filed: Apr. 20, 2010

(65) Prior Publication Data
US 2011/0253094 A1 Oct. 20, 2011

(51) Int. Cl.
*F02F 3/26* (2006.01)

(52) U.S. Cl.
USPC .................. 123/276; 123/298; 123/307

(58) Field of Classification Search
USPC .............. 123/298, 307, 193.6, 275, 276, 279, 123/285, 661
See application file for complete search history.

(56) References Cited

U.S. PATENT DOCUMENTS

| | | | | |
|---|---|---|---|---|
| 2,231,392 | A * | 2/1941 | McCarthy | 123/307 |
| 4,311,122 | A | 1/1982 | Banba et al. | |
| 4,779,587 | A | 10/1988 | Schweinzer et al. | |
| 5,065,715 | A * | 11/1991 | Evans | 123/263 |
| 5,103,784 | A * | 4/1992 | Evans | 123/279 |
| 5,121,722 | A | 6/1992 | Horiuchi | |
| 5,136,994 | A | 8/1992 | Gale | |
| 5,224,449 | A | 7/1993 | Fukano et al. | |
| 5,329,901 | A | 7/1994 | Onishi | |
| 5,357,924 | A | 10/1994 | Onishi | |
| 5,873,344 | A | 2/1999 | Kudou et al. | |
| 6,237,579 | B1 * | 5/2001 | Singh | 123/661 |
| 6,336,437 | B1 | 1/2002 | Baika et al. | |
| 6,601,561 | B1 | 8/2003 | Liu et al. | |
| 6,651,612 | B2 | 11/2003 | Kobayashi | |
| 6,701,875 | B2 * | 3/2004 | Weng et al. | 123/41.35 |
| 6,708,666 | B2 | 3/2004 | Roberts, Jr. | |
| 6,739,308 | B1 | 5/2004 | Curtis | |
| 6,892,689 | B2 * | 5/2005 | Bischofberger et al. | 123/193.6 |
| 6,955,165 | B2 | 10/2005 | Liu | |
| 6,997,158 | B1 | 2/2006 | Liu | |
| 7,096,848 | B2 * | 8/2006 | Ono et al. | 123/294 |
| 7,131,418 | B2 * | 11/2006 | Wieland | 123/193.6 |
| 7,318,406 | B2 | 1/2008 | Yi et al. | |
| 7,441,535 | B2 | 10/2008 | Yuzaki et al. | |
| 2003/0066507 | A1 | 4/2003 | Roberts, Jr. | |
| 2003/0217732 | A1 | 11/2003 | Kataoka et al. | |
| 2006/0090726 | A1 | 5/2006 | Meffert et al. | |
| 2006/0201143 | A1 | 9/2006 | Jacobsson et al. | |
| 2007/0163535 | A1 | 7/2007 | Walter | |

(Continued)

OTHER PUBLICATIONS

U.S. Office Action, mailing date Aug. 23, 2012 issued in U.S. Appl. No. 12/767,531 (8 pgs).

*Primary Examiner* — Hai Huynh

(74) *Attorney, Agent, or Firm* — Grossman, Tucker et al

(57) ABSTRACT

A piston for a direct injection engine is provided, the piston having a bowl at an upper end, the bowl forming a portion of a combustion chamber. The bowl includes an inner surface that defines a volume configured to receive a fuel-air mixture, the inner surface of the bowl including at least one surface feature that forms at least one edge portion as a target for the fuel spray, the edge portion defined by two or more surface portions. The surface feature may protrude from the inner surface of the bowl or may be recessed into the inner surface. Such surface features may reduce soot and improve fuel-air mixing.

31 Claims, 17 Drawing Sheets

U.S. PATENT DOCUMENTS

| | | |
|---|---|---|
| 2009/0188481 A1 | 7/2009 | Zhu et al. |
| 2009/0205607 A1 | 8/2009 | Levy |
| 2010/0206263 A1 | 8/2010 | Hasegawa |
| 2010/0258076 A1 | 10/2010 | Eismark et al. |
| 2011/0146613 A1* | 6/2011 | Oxborrow et al. ......... 123/193.6 |
| 2011/0253095 A1* | 10/2011 | Rothbauer et al. ............ 123/276 |
| 2011/0259297 A1* | 10/2011 | Rothbauer et al. ............ 123/276 |
| 2011/0271931 A1* | 11/2011 | Rothbauer et al. ............ 123/279 |

* cited by examiner

PISTON BOWL WITH SPRAY JET TARGETS

FIELD OF THE INVENTION

The present disclosure relates to a piston and an associated method of utilizing the piston within a direct injection engine wherein one or more surface features included in the bowl of the piston may be configured as targets for an injected fuel spray. The deflection of the spray off separate geometries within the piston bowl may improve the distribution of fuel along with an effect on, e.g., NOx, soot emission and/or heat release.

BACKGROUND

Modern day engines must meet ever-more stringent emission regulations while remaining as fuel efficient as possible. Such engines may be designed to meet extremely strict NOx and particulate matter regulations. The use of high levels of exhaust gas recirculation (EGR) to reduce NOx emissions may have an unfortunate side effect of increasing the emission of particulate matter (PM) or soot. There may be multiple approaches to achieve the emission targets and to reduce the particulate matter to levels which current after-treatment systems may be able to tolerate, each approach having its own advantages and disadvantages. Besides strategies like high injection pressure and late injection timing, after-treatment systems may be used to reduce both the NOx and particulate matter, but at a relatively higher initial coast for the engine/after-treatment system. This higher cost and complexity may result in a potential benefit for an in-cylinder emission reduction solution.

To meet the goals of reduced emissions and fuel efficiency, combustion chamber design may provide an opportunity to improve burn rate and fuel consumption while improving the fuel-air mixing rate so that particulate emissions may be reduced. High injection pressure systems may provide not only small droplets and more oxygen entrainment in the fuel/air mixture, but also may provide high momentum jets of fuel, which may be used to distribute the fuel to oxygen-rich regions within the combustion chamber. Due to the increased lift-off length and oxygen entrainment from the high injection pressure, the burning zone may now be moved closer to the bowl wall.

Traditional combustion system development has concentrated on axial symmetric bowl shapes. The traditional piston bowl shape may serve as a starting point for improvement, however, these shapes are generally 2-dimensional (smooth surfaced).

SUMMARY

In a first exemplary embodiment, the present disclosure is directed at a piston for a direct injection engine, the piston comprising a bowl at an upper end, the bowl forming a portion of a combustion chamber, wherein the bowl has an inner surface that defines a volume configured to receive a fuel-air mixture. The inner surface of the bowl includes at least one surface feature that forms at least one edge portion as a target for fuel spray, the edge portion defined by two or more surface portions that intersect at a radius of 0.1 mm-1.5 mm.

In another exemplary embodiment, the present disclosure is directed at a piston for a direct injection engine, the piston comprising a bowl at an upper end, the bowl forming a portion of a combustion chamber, wherein the bowl has an inner surface that defines a volume configured to receive a fuel-air mixture. The inner surface of the bowl includes at least one surface feature that forms at least one edge portion which protrudes into the bowl volume as a target for fuel spray, the edge portion defined by two or more surface portions that intersect at a radius of 0.1 mm-1.5 mm. The surface feature also forms at least one edge portion which is recessed into the bowl volume, the edge portions configured as targets for fuel spray, the edge portion defined by two or more surface portions that intersect at a radius of 0.1 mm-1.5 mm.

In a further exemplary embodiment, the present disclosure relates to a method of operating an internal combustion engine having at least one cylinder and a piston slidably disposed within the at least one cylinder, the method comprising moving the piston toward a top dead center position during a compression stroke. This may then be followed by spraying a fuel and air mixture into a piston bowl recessed in the piston, wherein the bowl has an inner surface that defines a volume configured to receive the fuel-air mixture. The inner surface of the bowl includes at least one surface feature that forms at least one edge portion as a target for fuel spray, the edge portion defined by two or more surface portions that intersect at a radius of 0.1 mm-1.5 mm. The surface feature including the edge portion then redirects the fuel-air mixture upon impact of the target to provide additional fuel-air mixing and/or distribution of fuel in the chamber.

BRIEF DESCRIPTION OF THE DRAWINGS

The features, operation and advantages of the invention may be better understood from the following detailed description of the preferred embodiments taken in conjunction with the attached drawings, in which.

DETAILED DESCRIPTION

Various features of the present invention will now become readily apparent to those skilled in the art from the following detailed description, wherein the invention is shown along with certain preferred embodiments. As will be realized the invention is capable of other and different embodiments, and its several details are capable of modification in various respects. Accordingly, the description is to be regarded as illustrative in nature and not as restrictive.

Today's high pressure injection systems for engines deliver a large amount of kinetic energy which can now be utilized to form a favorable distribution of fuel in the combustion chamber which may be applicable for diesel engines. The mixture distribution may now be influenced by the geometry of the spray impact zone along the inner surfaces of the piston bowl thus affecting the formation of emissions as well as heat release. In this disclosure, fuel-jet/bowl-wall interaction is employed to improve combustion characteristics. The bowl shapes may include various types of geometric features on and/or around the inner surfaces of the bowl of the piston to enhance performance. As noted above, the deflection and separation geometries within the piston bowl may now improve the distribution of fuel along with an effect on, e.g., NOx formation, soot emission and/or heat release. For example, soot may be reduced by as much as 15% by weight as compared to those pistons that do not incorporate the features noted herein.

While the disclosure is now discussed primarily with respect to diesel engines, it is contemplated that the features of the invention would be applicable to any engine using direct injection of fuel, for instance, gasoline or natural gas. Reference to direct injection of fuel may be understood as the injection of fuel into a cylinder containing a piston where the fuel is ignited to provide piston movement.

Computational Fluid Dynamic (CFD) modeling was used to identify the various piston bowl surface features, particularly edges, formed in the surface of a piston bowl which may now be used as solid obstacle targets within the spray jet path. This then may increase air entrainment due to improved atomization and penetration of the fuel spray into the air. As noted herein, such improved entrainment herein results in a reduction in soot (particulate matter) emissions. Such reduction may also now occur without a relative increase in NOx emissions. Initially, one may utilize a simulated spray chamber having a surface feature along one wall which is the target of the spray jet. This was then followed by confirmation studies utilizing a complete piston bowl geometry containing the identified surface feature.

Figure 1:
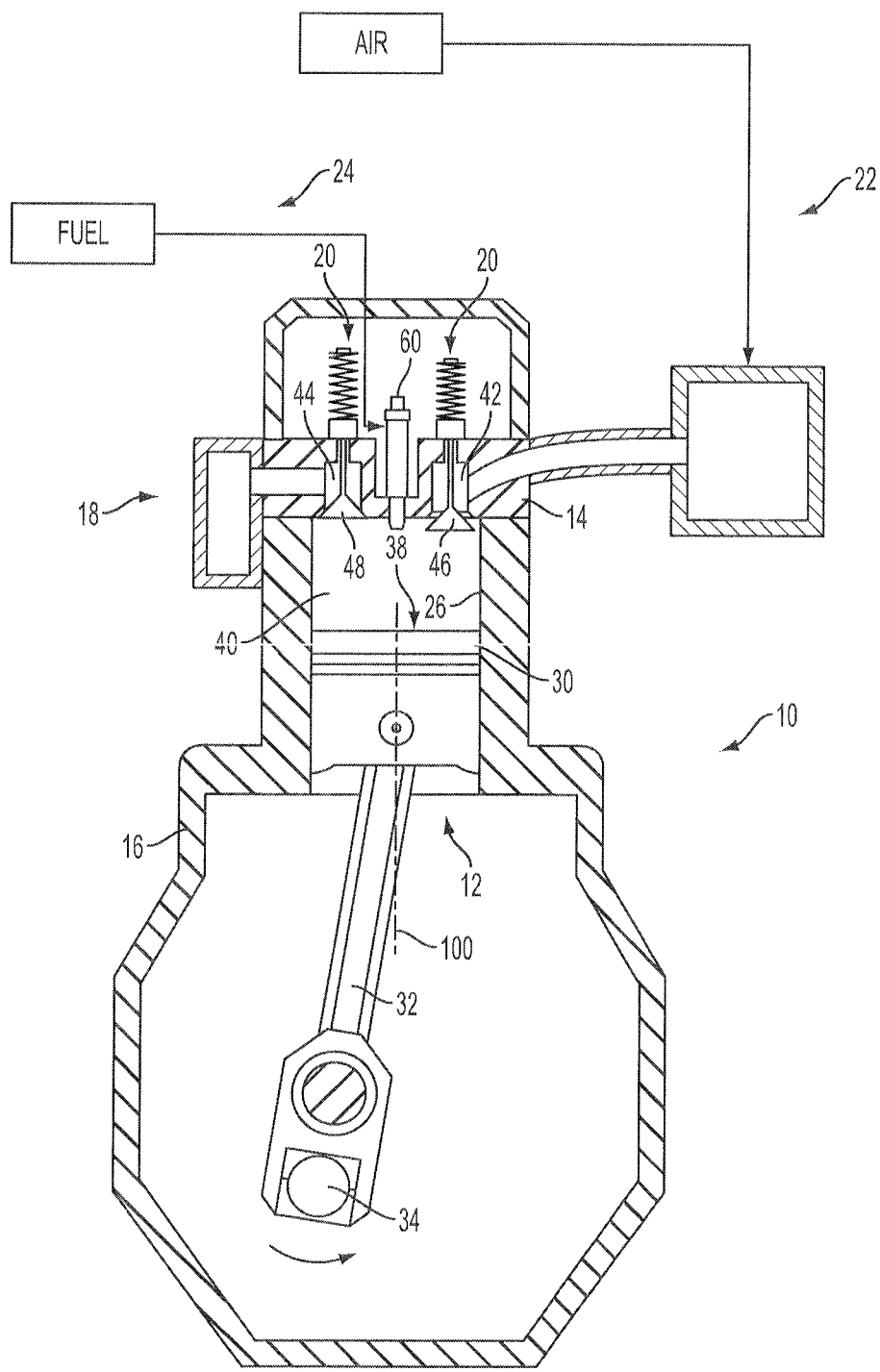
FIG. 1 is a schematic illustration of an exemplary internal combustion engine.

For reference purposes, FIG. 1 is a schematic illustration of an exemplary internal combustion engine showing one of a plurality of cylinders in sectional view. Such an internal combustion engine 10 may include a plurality of piston assemblies 12 and a cylinder head 14 associated with each piston assembly surrounded by an engine block 16, an exhaust system 18, a valve actuation system 20, an air induction system 22 and a fuel supply system 24. The piston assembly 12 may be slidably disposed within a cylinder 26. Piston assembly 12 may include a piston 30 pivotally connected to a connecting rod 32, which is pivotally connected to a crankshaft 34. A rotation of the crankshaft 34 may result in a sliding motion of piston 30 within the cylinder 26. The cylinder head 14 and end of the piston 30 form a combustion chamber 40. The combustion chamber 40 may include an intake port 42 and an exhaust port 44 and intake valve 46 and exhaust valve 48 disposed within the respective ports. At least one fuel injector 60 may be disposed within the cylinder head 14 to inject fuel into the combustion chamber at a predetermined time. Such injector may be located on the centerline 100 of the cylinder head (as shown) or may be offset from such centerline. The face 38 of piston 30 may surround a curved surface against which combustion gases may exert pressure to drive the piston downward. In the present disclosure, this curved surface may be a generally annular concave recess or bowl 50 as shown in FIG. 2.

Figure 2:
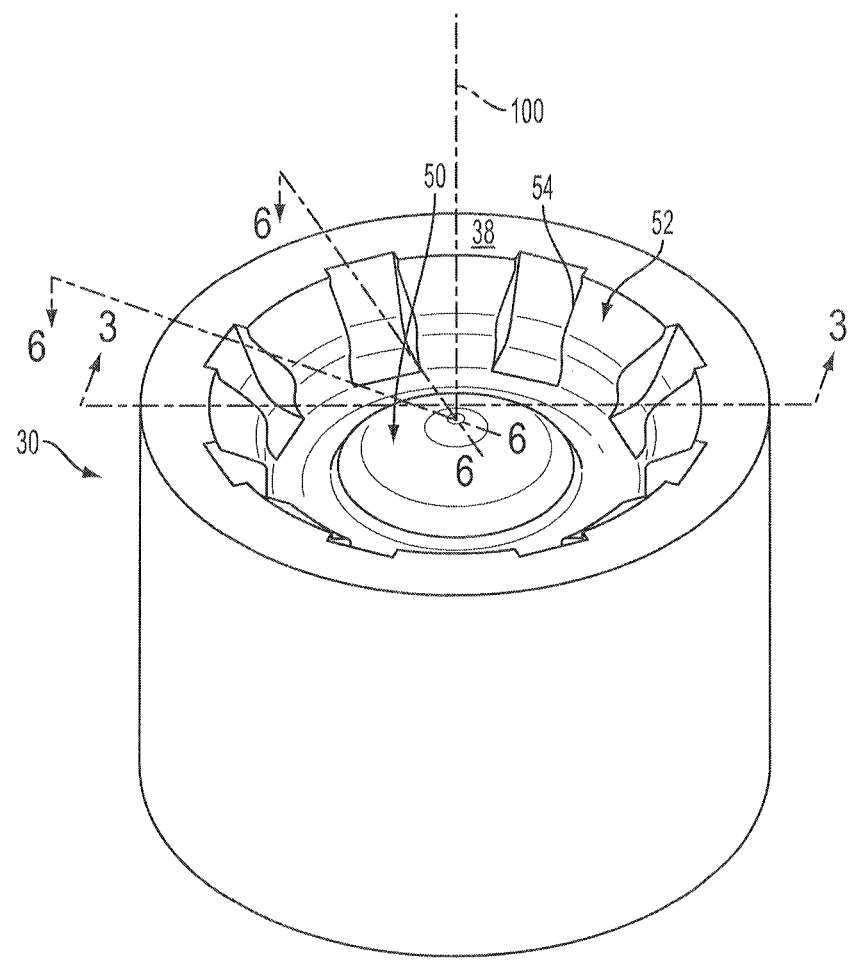
FIG. 2 is a perspective view of the piston of FIG. 1 showing an exemplary bowl shape.

FIG. 2 is a perspective view of the piston of FIG. 1 showing an exemplary bowl 50 which includes a plurality of surface features 52 arranged on the inner surface of the wall of the bowl. These surface features 52 in a first embodiment include edges 54 arranged radially from the centerline 100 of the bowl 50, the features extending at least partially between the face 38 and the centerline 100. The edges 54 of such features 52 represent solid obstacles such that a spray of fuel from an injector 60 engaging the edges 54 may then allow oxygen entrainment and fuel separation. That is, the fuel spray engaging edges 54 may now split or disperse and distribute further which may then mix more effectively with air and provide relatively lower soot, NOx levels and delayed heat release as well as relatively faster burn rates.

In addition, it may be appreciated therefore that the piston bowl inner surfaces defines a volume to receive a fuel-air mixture, and that an edge portion 54 may be defined by two surface portions 56A and 56B and the edge portion may be defined as having a radius. See FIG. 3. The radius of the edge portion may be in the range of 0.1 mm to 1.5 mm, at any numerical increment, such as at 0.01 mm increments. Accordingly, it may have a value of 0.1 mm, 0.11 mm, 0.12 mm, 0.13 mm, 0.14 mm, 0.15 mm, 0.16 mm, 0.17 mm, 0.18 mm, 0.19 mm, 0.20 mm, 0.21 mm, 0.22 mm, 0.23 mm, 0.24 mm etc. Preferably, the radius value may be in the range of 0.3 mm to 0.7 mm. In addition, as illustrated, the edge portion 54 may be disposed radially in the bowl, which may be understood as extending from the dome 'C" in FIG. 3. In addition, as discussed more fully below with respect to FIGS. 10 and 11, such edge may extend concentrically about the dome "C".

Similarly, an edge may be identified at 55 and defined by surface portions 55A and 56B. This edge is recessed into the inner surface of the piston bowl 50. However, similar to the above, this edge may again be defined by a radius in the range of 0.1 mm to 1.5 mm, at any numerical increment, such as at 0.01 mm increments. It may also have a value of 0.10 mm. 0.11 mm, 0.12 mm, 0.13 mm, 0.14 mm, 0.15 mm, 0.16 mm, 0.17 mm, 0.18 mm, 0.19 mm, 0.20 mm, 0.21 mm, 0.22 mm, 0.23 mm, 0.24 mm etc. In addition, the value may preferably be in the range of 0.3 mm to 0.7 mm. As may be appreciated, this edge 55 is recessed in the bowl relative to edge 54. In other words, edge 54 may also be describing as protruding into the volume of bowl.

It is contemplated that the number of surface features 52 and corresponding edges 54 formed in the surface of the bowl may be arranged symmetrically around the surface and number, for instance, 2, 3, 4, 5, 6, etc. This would lead to a number of edges 54 for engagement of the injected fuel within the bowl to number 4, 6, 18, 10, 12, etc. It may therefore be appreciate that the number of surface features 52 is simply a function of the available surface of the bowl and one may adjust in any numerical manner to influence fuel spray as noted herein.

Figure 4:
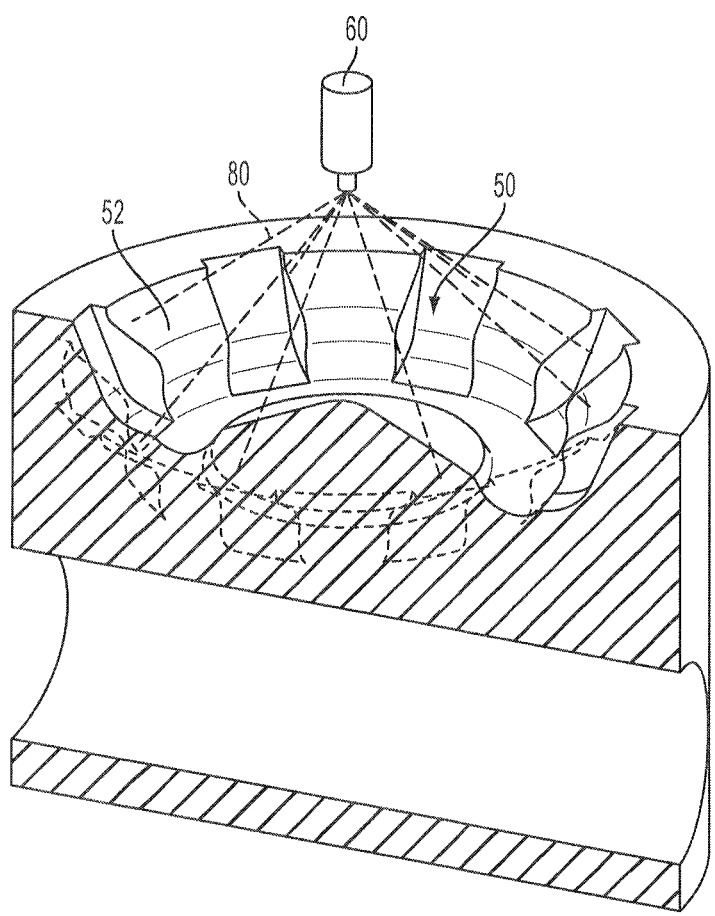
FIG. 4 illustrates a perspective view of a section of the bowl of FIG. 1 further including a central injector and an exemplary conical spray pattern of fuel.

As illustrated in FIG. 4 the spray pattern 80 may be in the shape of a cone radiating from an injector 60 mounted at the centerline of the cylinder head 14 and targeting geometric features 52 and edges 54 arranged around the inside surface of the bowl 50. In this view, the remainder of the bowl is shown in wire-frame to assist in understanding the invention.

Figure 5:
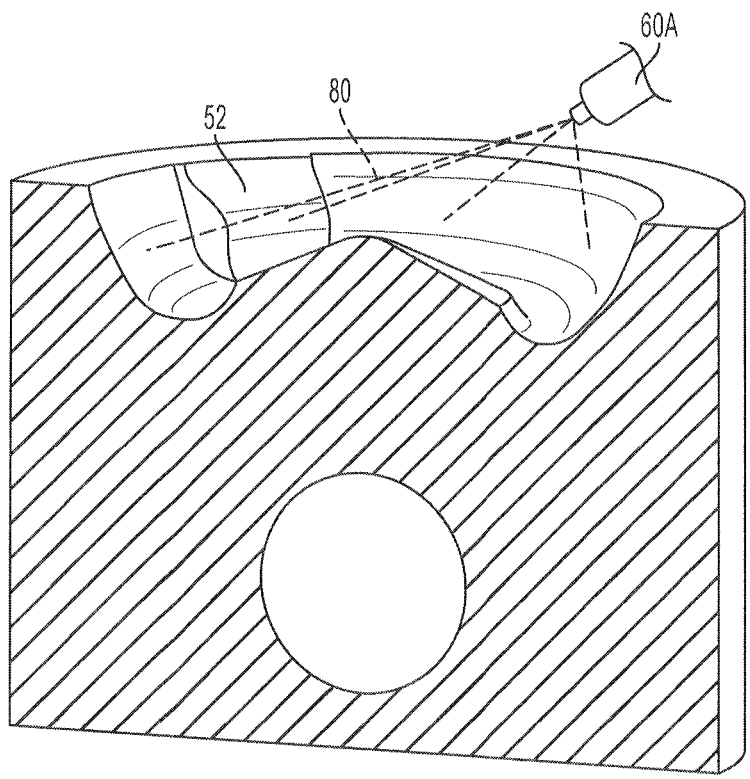
FIG. 5 illustrates another embodiment where an off-center injector sprays fuel at a surface feature in a bowl.

It is further contemplated that one or more surface features 52 and corresponding edges 54 may be arranged non-symmetrically around the surface of the bowl 50. That is, the features 52 may not be arranged in a regular repeating fashion within the bowl. In addition, the features 52 and corresponding edges 54 may be the target of an injector nozzle 60A which is disposed at any other location that is not on the centerline of the cylinder head. See FIG. 5.

Figure 3:
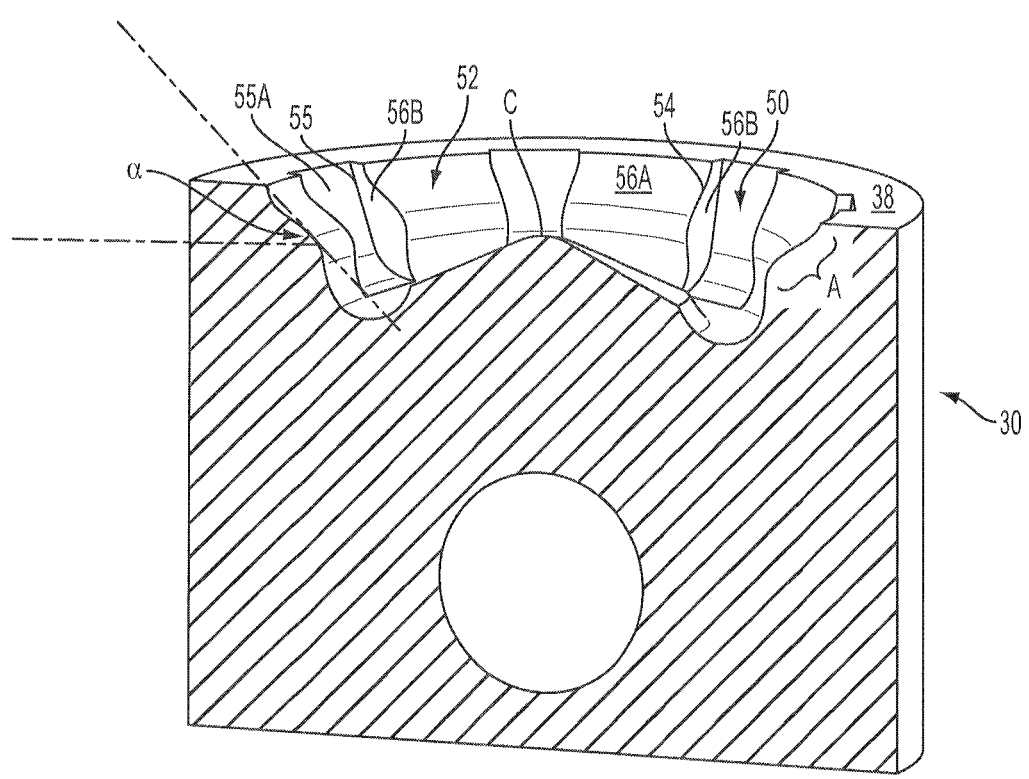
FIG. 3 is a cross-sectional view taken vertically through the center of the exemplary piston of FIG. 2 along line 3-3.

FIG. 3 is a perspective cross-sectional view vertically through the center of the exemplary piston of FIG. 2 along line 3-3 further illustrating the shape of the bowl 50. It should be noted that the surface feature 52 may include a nose portion A around at least a portion of the inner surface of the bowl and protruding into the bowl volume. As can be seen, the nose portion may be as a convex feature projecting into the bowl from the inner surface of the bowl within the volume of the bowl. The bowl nose A may be raised or lowered relative to the face 38 of the piston 30 to accommodate engine timing and maximize the volume of the combustion chamber. Accordingly, the inclination angle α of nose A (where the angle is achieved by drawing a tangent to the nose and a horizontal reference line as shown in FIG. 3) may be varied to position the sprayed fuel nearer the cylinder wall or create a relatively more open shape allowing the fuel to exit the bowl more easily such that the fuel is directed upwardly into the combustion chamber. The value of α may therefore vary from 10 degrees to 80 degrees, at 1.0 degree increments.

As illustrated in FIG. 4 the spray pattern 80 may be in the shape of a cone radiating from an injector 60 mounted at the centerline of the cylinder head 14 and targeting geometric features 52 and edges 54 arranged around the inside surface of the bowl 50. In this view, the remainder of the bowl is shown in wire-frame to assist in understanding the invention.

Figure 6:
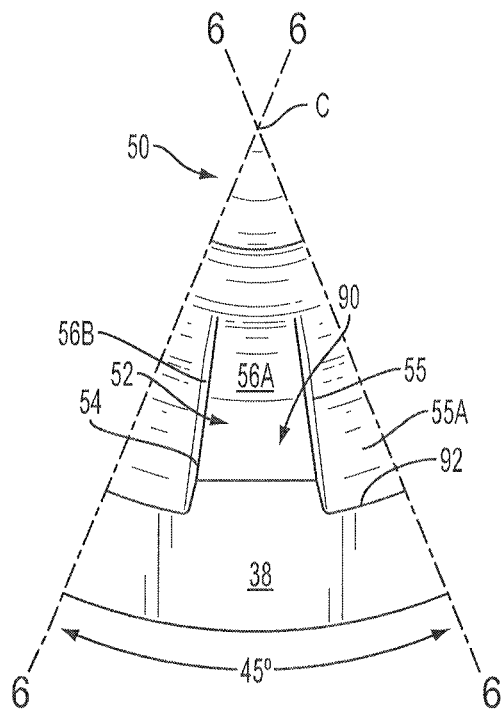
FIG. 6 is a partial cross-sectional view taken of the piston in FIG. 2 along lines 6-6, illustrating the geometric shape of an exemplary surface feature for a 45° slice of the bowl.

FIG. 6 is a partial cross-sectional view of the piston in FIG. 2, illustrating the geometric shape of the surface feature 52 for a 45° slice bounded by section lines 6-6 of the bowl 50. A spray pattern of fuel may be directed at a geometric surface feature 52 having an impact area 90 projecting into the bowl. The impact area 90 may be bounded by edges 54 and step-back regions 92. The angle and depth of the step-back regions 92 and radius of the edges 54 and 55 may be varied to allow different levels of oxygen entrainment and fuel separation to be achieved. The length and depth of surface feature 52 may vary along its length from the edge of the bowl face 38 to the piston bowl dome C and/or may extend only partially in a preferably radial pattern. However, the use of parallel edges 54 is also contemplated. Further, it is contemplated that the shape of the surface feature may not be symmetrical, as, for instance, the step-back regions 92 on either side of the impact area 90 may be of different widths. As noted above, one or more of the features 52 may be disposed, preferably radially, about the inside of the bowl 50.

Figure 7:
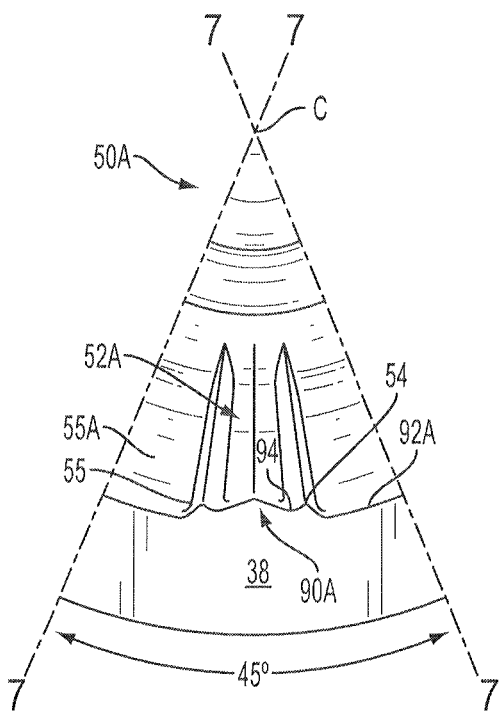
FIG. 7 is another partial cross-sectional view of a piston similar to that of FIG. 2, but illustrating a different geometric shape for a surface feature for a 45° slice (7-7) portion of a bowl.

FIG. 7 is another partial cross-sectional view of a piston similar to that of FIG. 2, illustrating a different geometric shape of surface feature 52A for a 45° slice bounded by section lines 7-7 of a bowl 50A. A spray pattern of fuel may be directed at a geometric surface feature 52A having an impact target 90A. The impact target 90A may be bounded by one or more guidance segments 94 and edges 54 and 55 as well as step-back regions 92A. The angle and depth of the step-back regions 92A and radius of the edges 54 and 55, as well as the length and angle of the guidance segments 94 may be varied to allow different levels of oxygen entrainment and fuel separation to be achieved. The length and depth of surface feature 52A may vary along its length from the edge of the bowl face 38 to the piston bowl dome C and/or may extend only partially in a preferably radial pattern. However, the use of parallel edges 54 is also contemplated. Again, it is contemplated that the shape of the surface feature 52A may not be symmetrical. In other words, the step-back regions 92 on either side of the impact target 90A may be of different widths, or the distance between the edge 54 and the center of the feature 52A may be different on one side of the center vs. the opposite side. Note that arrow 90A is pointing at the center of the feature 52A. As noted above, one or more of the features 52A may be disposed, preferably radially, around the inside of the bowl 50. V1 and V2 in FIG. 12 refer to the respective shapes of the feature 52A of FIG. 7, V1 for a symmetrical shape and V2 for a non-symmetrical shape wherein the step-back region 92A on one side of the impact target 90A is wider than on the opposite side.

It is contemplated that the geometry of the surface features 52, 52A not be symmetrical around a radial centerline for the feature to fold the reflected plumes of spray with the help of pattern swirl and to account for the displacement of the spray by the swirl. In other words, the step-back regions and guidance segments may not have the same dimensions and may be asymmetrical in their 3 dimensional shapes relative to a centerline of the surface feature.

As alluded to above, it has been found that geometric surface features such as 52 and 52A and variants thereof may redirect the injected fuel upon impact with the feature and separate the re-directed fuel/air mixture from the piston bowl, improving fuel-air mixing. Once again, this may lead to an enhanced combustion rate, reduced particulate matter emissions (soot) and reduced heat losses. Further, the surface features may divide the fuel and guide the fuel jet to adjacent regions of the combustion chamber. By maintaining the momentum of the fuel jet, fuel-air mixing may be improved. It is contemplated that the combination of select radii and flat sections within the surface feature conserve momentum and improve fuel jet motion so that adequate momentum is retained for separation of the fuel-air plume. Additionally, the angle and design of the surface feature may insure adequate separation of the fuel/air jet from the bowl without steering the jet to re-entrain with the main injection event.

Figure 7A:
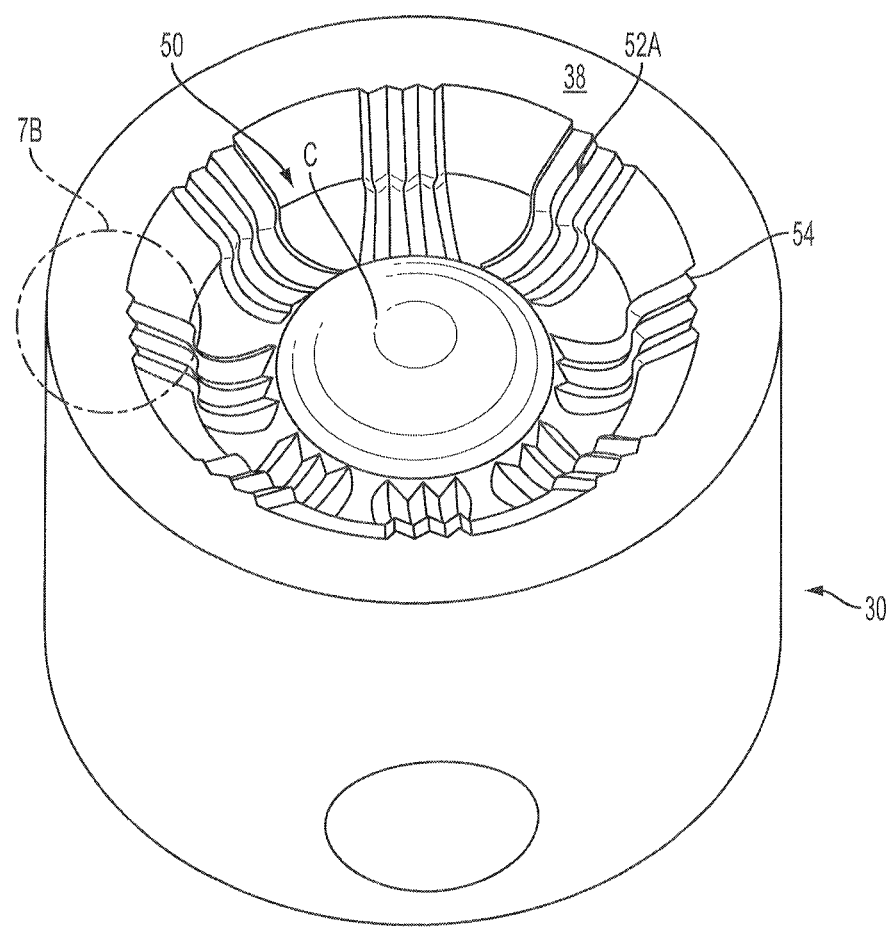
FIG. 7A is a another perspective view of the piston of FIG. 1 showing an exemplary bowl shape having a different pattern of surface features than shown in FIG. 2.

FIG. 7A is a another perspective view of the piston of FIG. 1 showing an exemplary bowl shape having a pattern of surface features 52A like those of FIG. 7 but in a parallel configuration and extending from the face 38 of the piston through the lowest point in the bowl 50 to the lower edge of the dome C. As with FIG. 7, the edges 54 may redirect the injected fuel upon impact.

Figure 7B:
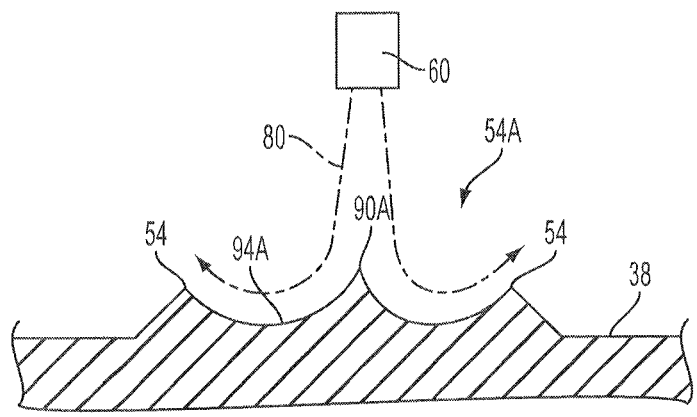
FIG. 7B is a top view of the circled area in FIG. 7A illustrating a variation of the surface features.

FIG. 7B is a top view of the circled area in FIG. 7A illustrating a variation of the surface features 52A of FIG. 7A wherein the impact target 90A is bounded by edges 54 and is separated from those edges by curved guidance segments 94A. In this view, the impact target 90A and edges 54 all protrude inward from the inside edge of the piston face 38.

Figure 7C:
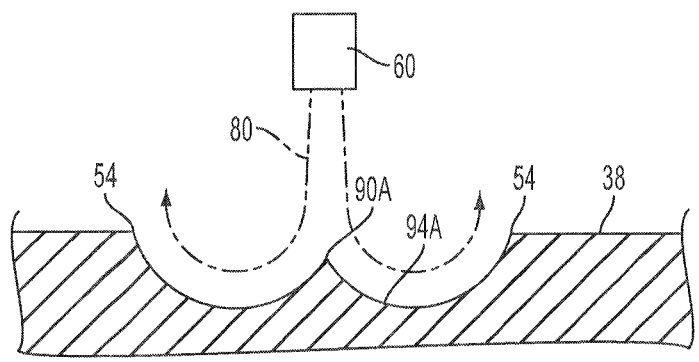
FIGS. 7C and 7D illustrate other configurations for the features of FIG. 7B.
Figure 7D:
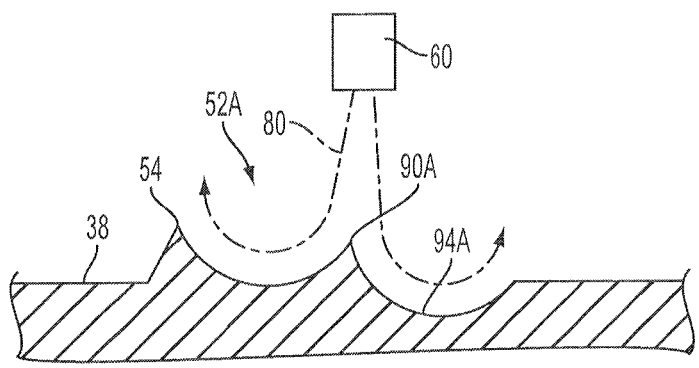

FIGS. 7C and 7D illustrate other configurations for the features of FIG. 7B. In FIG. 7C, the impact target 90A and the curved guidance segments 94A are recessed into the edge of the face 38 (and into the bowl nose A). In FIG. 7D, the feature 52A is shown as tipped with impact target 90A protruding beyond the inner edge of face 38 and one of the guidance features 94A recessed into the edge of the face. Accordingly, it is contemplated that any combination of edges and guidance segments may be employed whether protruding, recessed, symmetrically disposed or asymmetrically disposed in the piston bowl.

Figure 8:
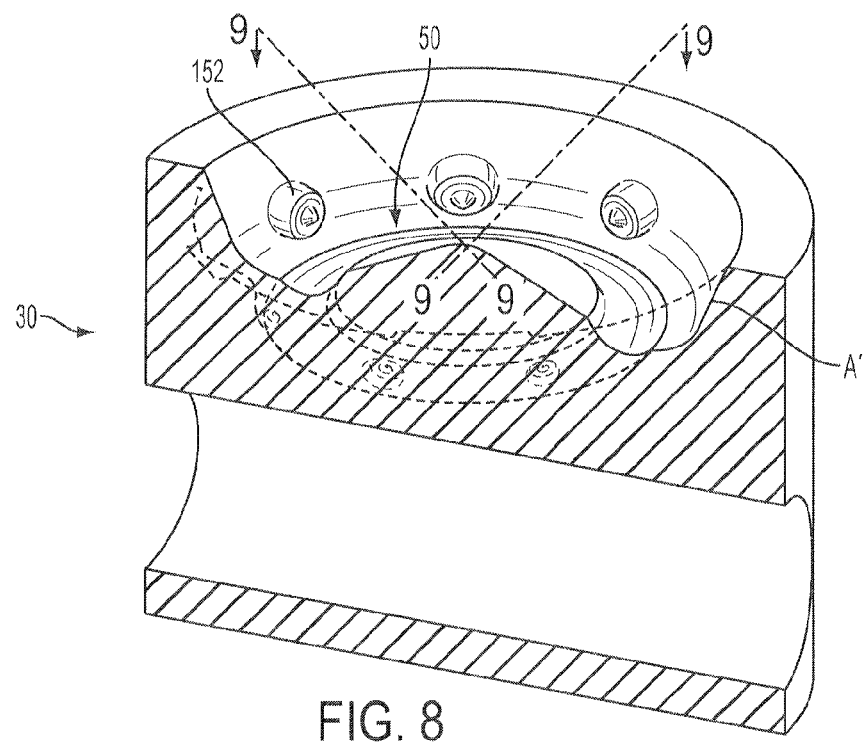
FIG. 8 illustrates a cross-sectional perspective view of another piston bowl similar to that of FIG. 3, but illustrating a still different geometric shape of surface feature on the surface of the bowl.

In another embodiment, the surface features may comprise one or a plurality of discrete geometric shapes disposed on and projecting from or into the surface of the piston bowl. For example, FIG. 8 illustrates a cross-sectional perspective view of another piston bowl similar to that of FIG. 3, identifying a different geometric shape of a surface feature for arrangement around the bowl 50' of piston 30. In this exemplary embodiment, nose A' has a relatively steep angle and relatively less pronounced intrusion into the volume of the bowl which is used to allow the inclusion of discrete targets for the fuel spray. The discrete targets may preferably have a circular or ellipsoid character which targets may be disposed around the surface within the bowl.

Figure 9:
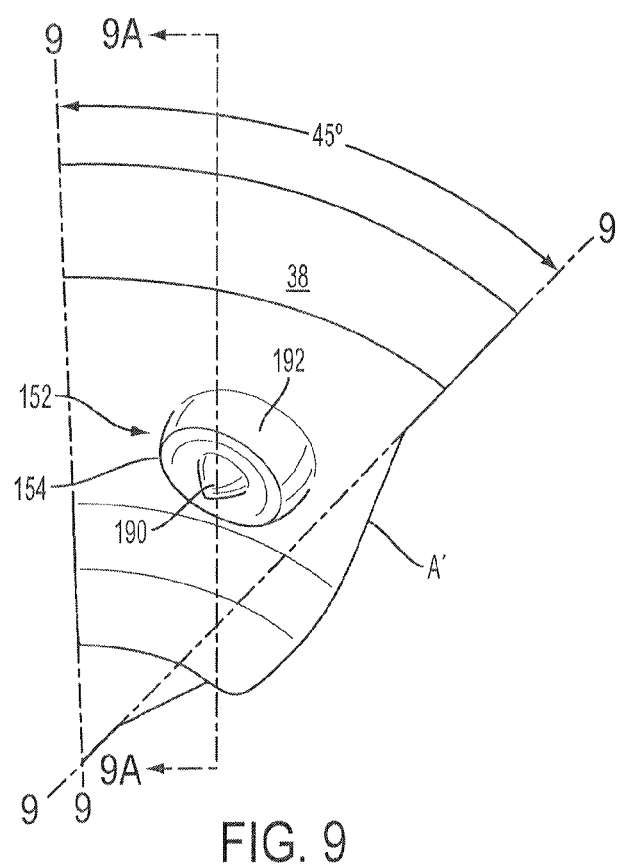
FIG. 9 is a 45° slice (9-9) of the bowl of FIG. 8 further illustrating a discrete geometric surface feature.

In FIG. 9, an exemplary discrete surface feature 152 in the form of a circle is disposed on and projects from the inner surface of the bowl at nose A', as shown in FIG. 8. The feature 152 may include edge 154, an impact feature 190 configured as a relatively sharp projection and a projection surface 192. It should be noted that, as above, the edge 154 may function as a separation edge for the fuel spray and the projection surface may allow oxygen entrainment and enhance separation of the fuel into smaller droplets. The sharpness, shape and depth of the feature 190 and of the edge 154 may be varied to redirect the injected spray. The feature 190 and edge 154 may be recessed into the bowl wall or project therefrom as shown. This edge 154 may have a radius of 0.5 mm to 50.0 mm, preferably 1.0 to 10.0 mm in any numerical increment, such as in 0.01 mm increments. Furthermore, for instance, the diameter of the feature 152 may be larger or smaller and may be configured such that it has a diameter that places the edge 154 to engage the fuel spray. Similarly, the length and sharpness of the projection 190 may vary, or even be of a non-conical shape. Projection 190 may also have a radius of 0.1 mm-5.0 mm, preferably 0.5 to 2 mm in any numerical increment, such as 0.01 mm increments and may also be recessed into the inner surfaces of the piston bowl.

Figure 9A:
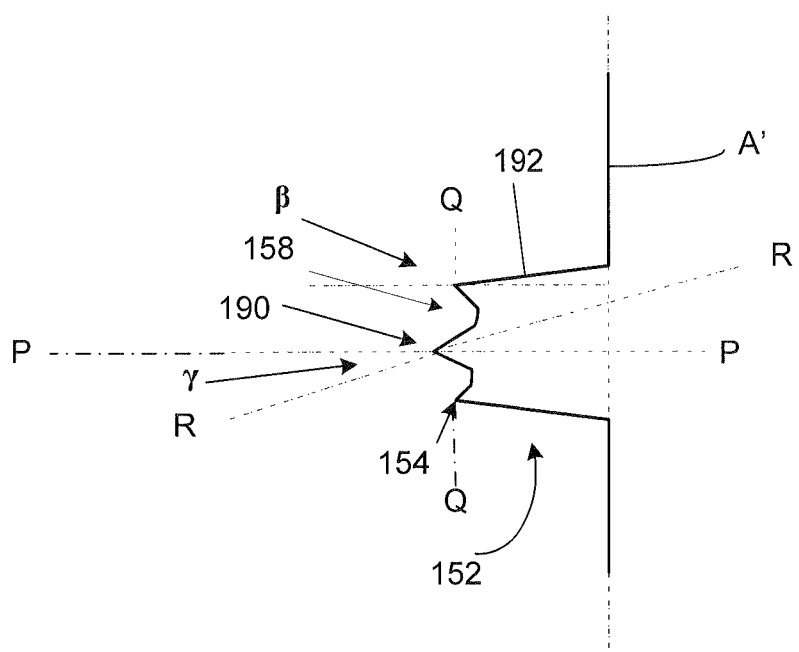
FIG. 9A is a cross section of surface feature 152 shown in FIG. 9.

FIG. 9A is a cross section of surface feature 152 shown in FIG. 9. As shown, it is possible that the feature 152 and/or projection 190 may be angled with respect to the surface of nose A'. In other words, the surface Q-Q bounded by edges 154 may be angled with respect to a line P-P normal to the surface of nose A'. Accordingly, the angle β may be between 30° to 150°. This may then create an asymmetric deflected flow of the fuel spray. In addition, the projection 190 (having a central axis represented by line R-R) may also be angled with respect to a line P-P normal to the surface of nose A', and may be at an angle of 0° to 60°. This is shown as angle γ in FIG. 9A. While the angled relationship of feature 152 in FIG. 9A is shown relative to a vertical plane 9A-9A (90°) in FIG. 9, it is contemplated that such an angled relationship may occur at any angle from 0°-360°. Stated another way, the protrusion and/or the geometric shaped feature may each have a central axis and the protrusion and/or feature may be angled rotationally from that axis.

In addition, the recess or guidance feature 158 around projection 190 may have a radius of 2.0 to 50.0 mm, preferably 3.0 to 10.0 mm in any numerical increment, such as 0.5 mm increments.

Further, the feature 152 may be positioned higher or lower on the surface of nose A' (e.g. relatively closer to the cylinder head or further away) to coincide with injector targeting and the position of the piston at start of injection. The size (diameter, depth, etc.) of the features 152 may be changed as a function of the distance to the injector, spray angle of the fuel, spray pressure, etc.

While circular features have been illustrated, it is contemplated that such discrete features as 152 may be of any geometric shape, closed or open, and with any number of sides, the sides not necessarily of equal length (that is, the shape may not be symmetrical), including but not limited to, circles, ellipses, and flat sided shapes having 3 to 12 sides. There may also be one or a plurality of discrete features having a geometric shape. One common characteristic that may be provided, however, is that the feature 152 includes an impact area that protrudes from (or is recessed into) the surface of the bowl and is defined by edges which also protrude from (or are recessed into) a surface within the piston bowl.

Figure 10:
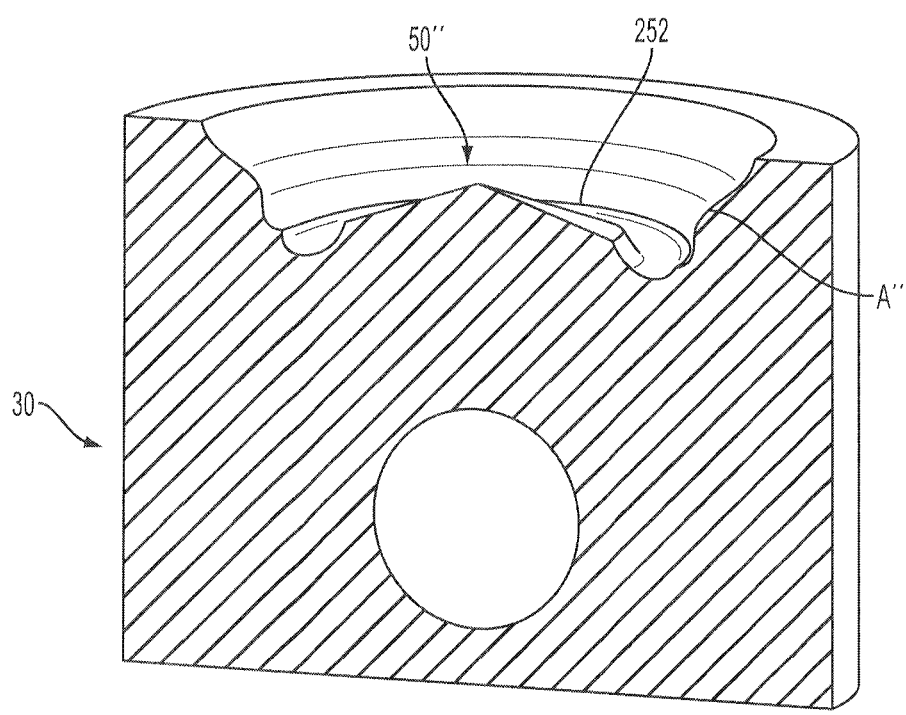
FIG. 10 illustrates a cross-sectional perspective view of another piston bowl similar to that of FIG. 3, but illustrating a different protruding surface feature, in this case an axial or circumferential separation edge arranged around the bowl.

In another embodiment of the invention, the surface features in the bowl may comprise concentric projections protruding from the surface of the bowl. For example, FIG. 10 illustrates a cross-sectional perspective view of another piston bowl identifying a concentric separation edge 252 arranged around the bowl 50" of piston 30. The separation edge 252 may again have a radius of 0.1 mm to 1.5 mm, in 0.01 mm increments. The separation edge 252 may also again be one that projects into the volume of the bowl or it may be recessed into an inner surface of the bowl. In this exemplary embodiment, a relatively shallower angled and relatively shorter nose A" is used. In addition the bowl nose A may be lowered to accommodate injection timing requirements. The projecting feature 252 may be located along a portion of the surface of the bowl and may be a continuous or intermittent feature. The height and radius and location of the feature line may also be varied to effect wall wetting. The concentric separation edge may be one that is offset relative to the central axis of the bowl.

Figure 11:
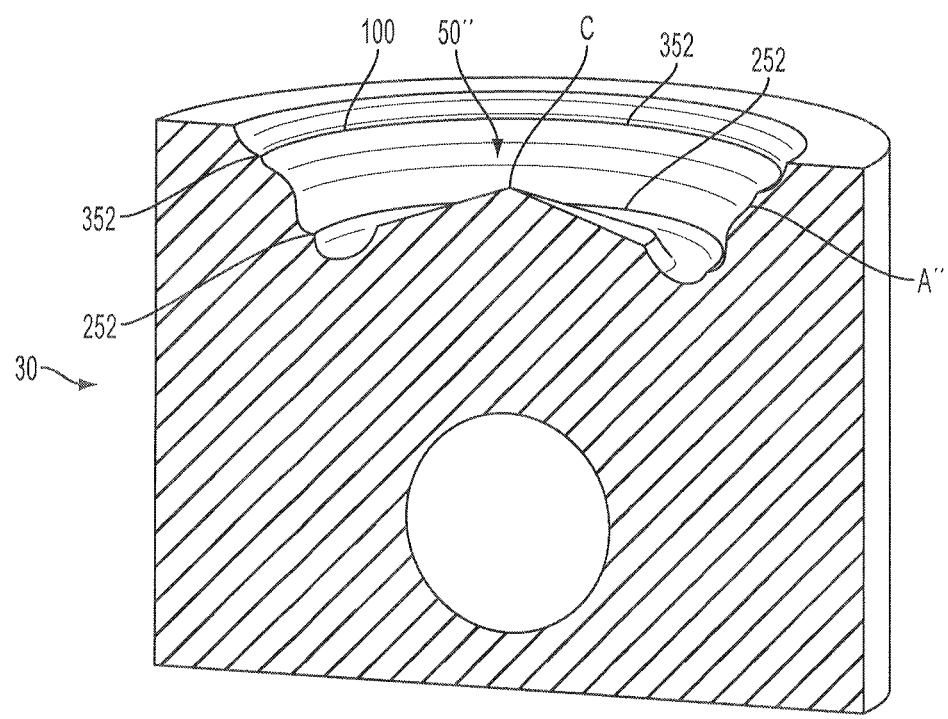
FIG. 11 illustrates a cross-sectional perspective view of a similar piston bowl to that of FIG. 10, but illustrating two axial or circumferential separation edges for arranged around the bowl.

FIG. 11 illustrates a related cross-sectional perspective view of a piston bowl similar to that of FIG. 10, but illustrating two surface features, in this case axial or circumferential separation edges 252 and 352 may be concentrically arranged around the bowl 50" of piston 30. In this exemplary embodiment, nose A" is interrupted with a second axial or circumferential projecting feature 352 to further reduce wall wetting of the fuel spray. In addition, the bowl nose A has been lowered to accommodate injection timing requirements. The projecting feature 352 may be located along a portion of the surface of the bowl and may be a continuous or intermittent feature. The height and radius of the sharp portion of the feature lines may be varied to effect wall wetting. While illustrated as concentric, it is further contemplated that the separation edges 252, 352 may not be concentrically arranged around piston bowl dome C.

In FIGS. 10 and 11 as with FIGS. 6-9, the separation edges 252, 352 may protrude into the volume of the bowl or may be formed as recesses or grooves in the inner surface of the bowl.

The use of 3-dimensional spray-wall interactions through the use of geometric surface features as targets for the spray jets as disclosed herein may provide an approach to reduce two major causes of soot: the wetted wall area and the interaction between the individual fuel jets. This reduction may be achieved by introducing the above referenced target geometries into the surface of the piston bowl which then redirect the fuel jet upon impact and separate the redirected fuel-air jet from the surface of the piston bowl and improve fuel-air mixing (oxygen entrainment). This then may result in an enhanced combustion rate while particulate matter emissions and heat losses are reduced.

Figure 12:
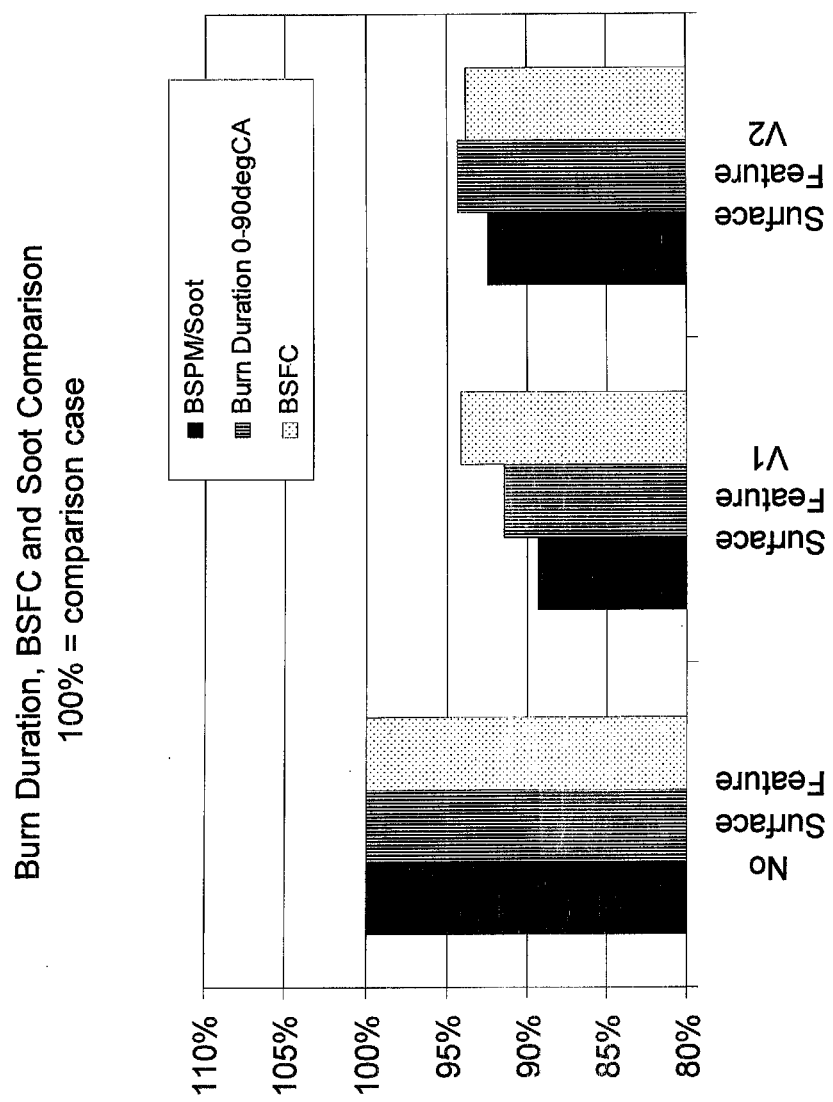
FIG. 12 is a table which illustrates the relative performance of a piston bowl without surface features compared to two versions, V1 and V2, of the surface feature of FIG. 7.
Figure 13:
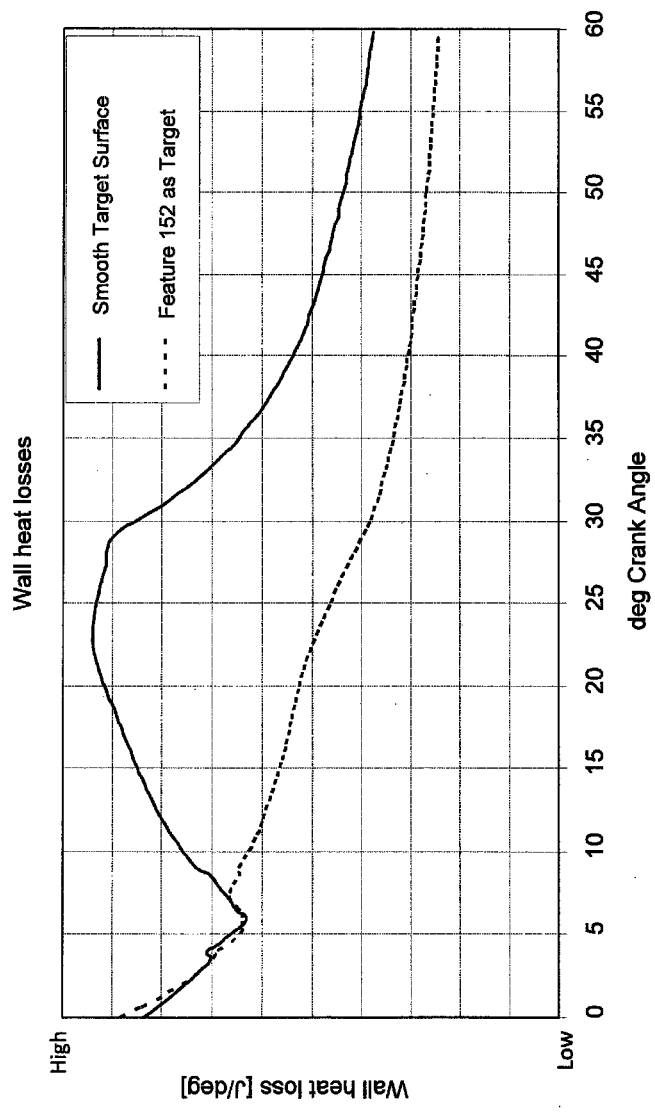
FIG. 13 is a plot of wall heat losses versus crank angle for one of the target features.

Attention is therefore directed to FIG. 12, which is a table which illustrates the relative performance of a piston bowl without surface features compared to two versions, V1 and V2, of the surface feature of FIG. 7. These two versions differ in that the step-back regions 92A are in V1 are symmetrical and in V2 the step-back regions are not symmetrical. In both situations, however, the BSPM or brake specific particulate matter (soot) is reduced from that situation where the bowl has no surface features (i.e. a standard bowl). Specifically, the soot formation is reduced by an amount up to about 12%. In addition, the burn duration (0-90 degrees crank angle) is reduced by an amount up to about 8.0%. Finally, the brake specific fuel consumption (BSFC), which may be understood as the fuel in grams consumed divided by the power in kilowatt-hours (g/kWh), is reduced by an amount up to about 6.0%.

Figure 14:
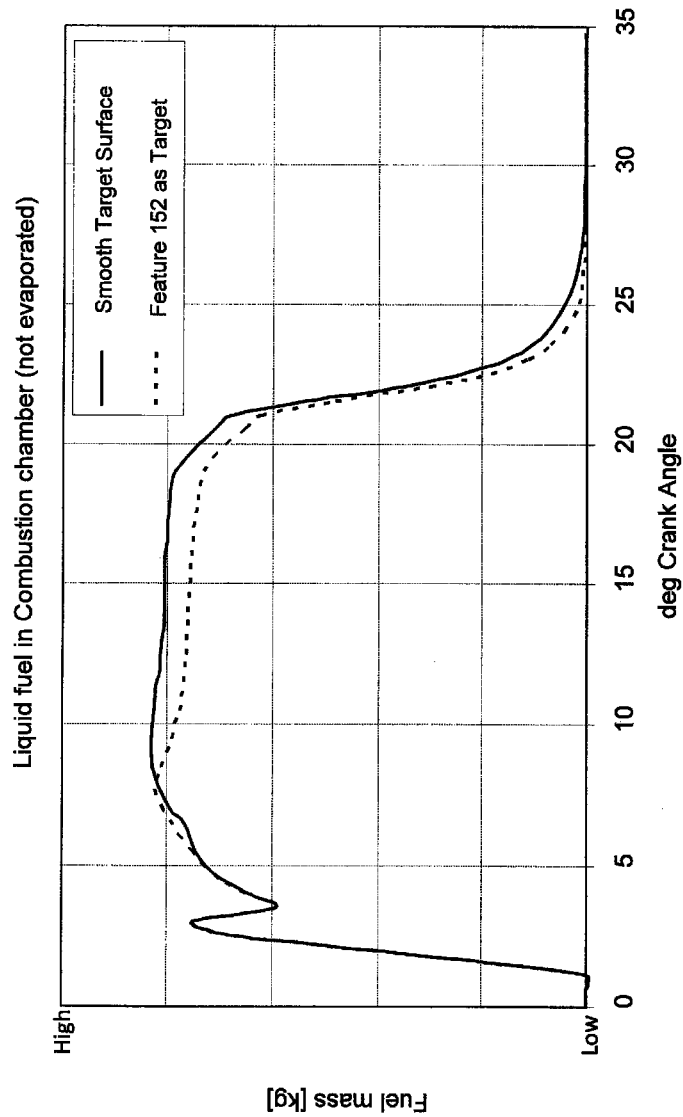
FIG. 14 is a plot of fuel mass versus crank angle for one of the target features.
Figure 15:
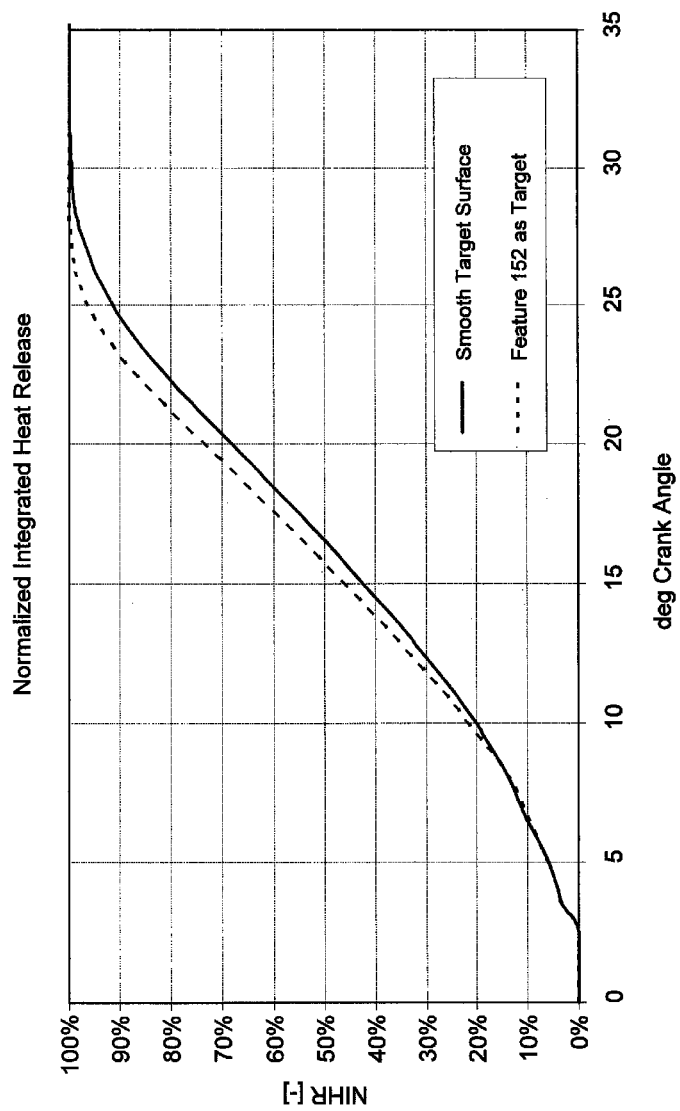
FIG. 15 is a plot of normalized integrated heat release (NIHR) versus crank angle.
Figure 16:
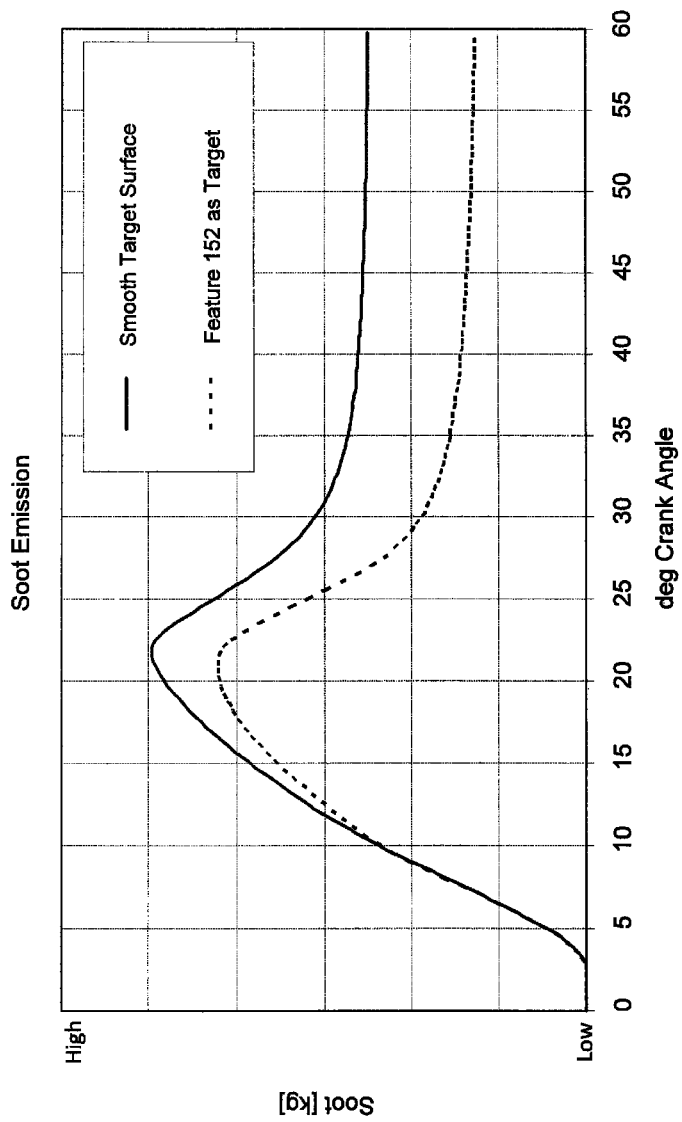
FIG. 16 is a plot of soot emission versus crank angle.

FIGS. 13-16 illustrate the results of CFD modeling of a simulated spray chamber having a smooth surface as the target of a spray pattern vs. a target similar to feature 152 in FIG. 9. Note that in FIG. 13 for crank angles between 10° and 60°, the wall heat losses are relatively lower for the 152 feature geometry than for a smooth surface target. In FIG. 14, for crank angles of 8-25°, the fuel mass (not evaporated) in the chamber is relatively lower for the 152 feature geometry than for a smooth surface target. As shown in FIG. 15, for crank angles of 10-28°, the normalized integrated heat release (NIHR) for crank angles of 10-28° is higher for the 152 feature geometry than for a smooth surface target. In FIG. 16, for crank angles of about 12-60°, soot emissions are lower for the 152 feature geometry than for a smooth surface target.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A piston for a direct injection engine, the piston comprising a bowl at an upper end, the bowl forming a portion of a combustion chamber, wherein the bowl has an inner surface that defines a volume configured to receive a fuel-air mixture, the inner surface of the bowl including at least one surface feature that forms at least one edge portion as a target for fuel spray, the edge portion defined by two or more surface portions that intersect at a radius of 0.1 mm-1.5 mm.

2. The piston of claim 1 wherein said radius is 0.3 mm to 0.7 mm.

3. The piston of claim 1 wherein said bowl includes two edge portions, one of which protrudes into the bowl volume, one of which is recessed into a bowl inner surface.

4. The piston of claim 1 wherein said at least one edge portion is disposed radially in said bowl.

5. The piston bowl of claim 1 wherein said at least one edge portion is concentrically disposed in said bowl.

6. The piston of claim 1 wherein said bowl includes a central axis and a dome portion is arranged at said central axis.

7. The piston of claim 1 wherein said at least one surface feature protrudes into the bowl volume in the form of a nose portion.

8. The piston of claim 1 wherein said at least one edge is disposed continuously or intermittently on an inner surface of said bowl.

9. The piston of claim 1 wherein said at least one edge portion comprises a geometric shape.

10. The piston of claim 9 wherein said shape is a circle, an ellipse or a flat-sided shapes having 3 to 12 sides.

11. The piston of claim 9 wherein said geometric shape includes an edge portion and a projection and said edge portion and said projection each has a radius of 0.1 mm to 1.5 mm.

12. The piston of claim 9 wherein said piston bowl includes a plurality of said geometric shapes.

13. The piston of claim 9 wherein said edge portion and/or said projection is angled relative to said inner surface of said bowl.

14. The piston of claim 1 wherein said at least one edge is configured to engage with said fuel spray and provides oxygen entrainment and fuel separation.

15. The piston of claim 1 wherein at least two surface features are provided and are symmetrically disposed in said piston bowl.

16. The piston of claim 1 wherein at least two surface features are provided and are asymmetrically disposed in said piston bowl.

17. The piston of claim 1 wherein step-back regions are formed adjacent said surface feature.

18. The piston of claim 1 wherein said surface feature is not symmetrical in shape.

19. The piston of claim 1 wherein said at least one surface feature is recessed into the bowl volume.

20. A piston for a direct injection engine, the piston comprising a bowl at an upper end, the bowl forming a portion of a combustion chamber, wherein the bowl has an inner surface that defines a volume configured to receive a fuel-air mixture, the inner surface of the bowl including:

at least one surface feature that forms at least one edge portion which protrudes into the bowl volume as a target for fuel spray, the edge portion defined by two or more surface portions that intersect at a radius of 0.1 mm-1.5 mm and said at least one surface feature forms at least one edge portion which is recessed into the bowl volume, the edge portions configured as targets for fuel spray, the edge portion defined by two or more surface portions that intersect at a radius of 0.1 mm-1.5 mm.

21. The piston of claim 20 wherein said edge portions are disposed radially in said bowl.

22. The piston bowl of claim 20 wherein said edge portions are concentrically disposed in said bowl.

23. The piston of claim 20 wherein said bowl includes a central axis and a dome portion is arranged at said central axis.

24. The piston of claim 20 wherein said at least one surface feature that protrudes into the bowl volume is in the form of a nose portion.

25. The piston of claim 20 wherein said edge portions are disposed continuously or intermittently on an inner surface of said bowl.

26. The piston of claim 20 wherein said edge portions are configured to engage with said fuel spray and provides oxygen entrainment and fuel separation.

27. The piston of claim 20 comprising two of more of said surface features that are symmetrically disposed in said piston bowl.

28. The piston of claim 20 comprising two or more of said surface features that are asymmetrically disposed in said piston bowl.

29. The piston of claim 20 wherein said at least one surface feature is not symmetrical in shape.

30. A method of operating an internal combustion engine having at least one cylinder and a piston slidably disposed within the at least one cylinder, the method comprising:
 moving the piston toward a top dead center position during a compression stroke;
 spraying a fuel and air mixture into a piston bowl recessed in said piston, wherein the bowl has an inner surface that defines a volume configured to receive said fuel-air mixture, the inner surface of the bowl including at least one surface feature that forms at least one edge portion as a target for fuel spray, the edge portion defined by two or more surface portions that intersect at a radius of 0.1 mm-1.5 mm;
 wherein said surface feature including said edge portion redirects said fuel-air mixture upon impact of said target to provide additional fuel-air mixing.

31. The method of claim 30 wherein said additional fuel-air mixing provides for a reduction in particulate matter emissions as compared to a piston bowl that does not contain said surface feature including said edge portion.

* * * * *